July 13, 1937.  L. R. CHANDLER  2,087,102

DEVICE FOR DETERMINING DIMENSIONAL REDUCTIONS

Filed Sept. 17, 1935

Inventor
L. Reginald Chandler
per Rowland V. Patrick
Attorney

Patented July 13, 1937

2,087,102

UNITED STATES PATENT OFFICE 2,087,102

DEVICE FOR DETERMINING DIMENSIONAL REDUCTIONS

Leo Reginald Chandler, Hingham, Mass.

Application September 17, 1935, Serial No. 40,922

5 Claims. (Cl. 33—76)

The present invention relates to proportional reduction charts and more particularly to devices for determining the specifications for dimensional reduction of photographs, drawings and the like for engraving, lithographing and similar purposes.

Reproductions of photographs or the like appearing in printed matter are generally reduced in size as compared with the originals. This reduction may be, and usually is, accomplished during engraving by deletion of border portions and by photostatic reduction of the portion to be reproduced, according to specifications furnished by the printer.

The determination of the specifications for reduction is frequently a complex task, involving a great deal of measurement and computation. It has heretofore been the usual practice to make these computations on a slide rule from measurements made upon the photograph or design. This practice has proved laborious and time consuming, and prone to inaccuracies productive of costly alterations in plates after engraving.

It is the object of the present invention to provide a device whereby such reduction specifications may be simply and accurately determined by adjustment of a masking frame upon the surface to be reduced and upon a reduction scale with which it cooperates.

Referring to the drawing:—

Figure 1:
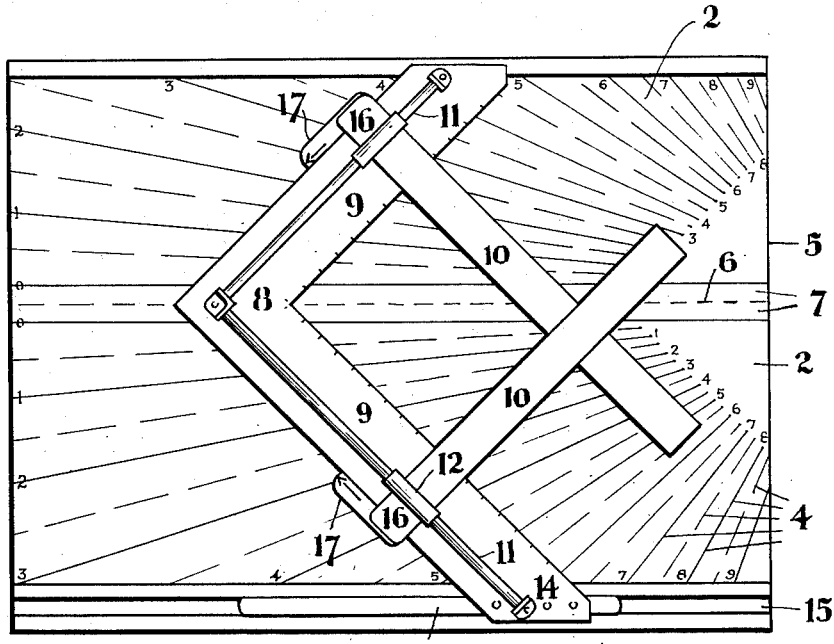
Fig. 1 is a plan view of a device constructed in accordance with my invention.

In the embodiment of my invention illustrated in the accompanying drawing, a base 1 of light weight wood or other suitable material has upon its upper surface a reduction scale 2. Scale 2 is preferably formed upon a separate sheet of cardboard 3 or similar material and secured to base 1 in any convenient manner.

Scale 2 comprises lines 4 converging toward one edge line 5 thereof. Said lines 4 are so constructed as to be always equally spaced apart upon two intersecting lines moving in a constant angular relation of 45° to edge line 5 and with their point of intersection moving upon a line at right angles to edge line 5.

Scale 2 may conveniently be constructed in the following manner: Upon the surface selected for the scale, a line such as edge line 5 is drawn and at a selected point thereon a second line such as dotted line 6 is drawn perpendicular to line 5. From a point on line 6 near its intersection with line 5 two lines are drawn, one at either side of line 6, to intersect line 5 and at 45° angles to lines 6 and 5. Said 45° lines are then divided into a predetermined number of equal parts. This procedure is then repeated at another point on line 6, the number of divisions of the second set of 45° lines being the same as that of the first. Lines 4 may then be drawn at either side of line 6 between corresponding points of division of the two sets of 45° lines. Lines 4 are then consecutively numbered at either side of line 6, corresponding lines on opposite sides of line 6 having the same numbers, said numbers representing the units in which measurements are to be made which may be inches, and fractions thereof, agate lines, picas, columns, the metric system or other convenient measuring units.

I prefer to separate the two corresponding parts of scale 2 by a margin such as 7, formed by two parallel lines at either side of line 6 and equally spaced therefrom. When such a margin is employed, only so much of the 45° lines as is included between each of said margin lines and line 5 is divided into equal intervals as above described, said margin lines forming the zero lines of the two scale parts.

The number of lines 4 employed should be sufficient to give the minimum and maximum readings desired, the number of lines 4 desired predetermining the number of equal intervals into which the 45° construction lines are divided, as above described.

Masking frame 8 comprises two straight strips 9, joined at right angles, each strip 9 having an arm 10 mounted thereon. Strips 9 may be marked with an inch or other convenient scale reading outwardly from the point of joinder of their inner edges.

Arms 10 are slidably mounted upon strips 9 and at right angles thereto. In the masking frame shown, the slidable mountings for arms 10 comprise rods 11 affixed in brackets upon strips 9 each rod 11 extending in parallel relation with the sides of strip 9 to which it is attached, and adapted to receive a sliding sleeve 12 to which is secured one of arms 10. One of arms 10 is positioned to slide also upon the other arm 10, so that at any position of said strips their inner edges form a rectangle with the inner edges of strips 9.

Frame 8 is movably attached to base 1 and extends over scale 2 in a plane parallel thereto with the inner edges of strips 9 toward line 5, and with the apex of the angle formed between strips 9 always lying upon line 6. The preferred mounting shown in the drawing comprises a slide 13 attached at an end 14 of one of strips 9, at an angle of 45° to the sides of said strip 9.

Slide 13 is adapted to fit within groove 15 constructed along one side of base 1 and extending parallel with line 6 of scale 2.

Figure 2:
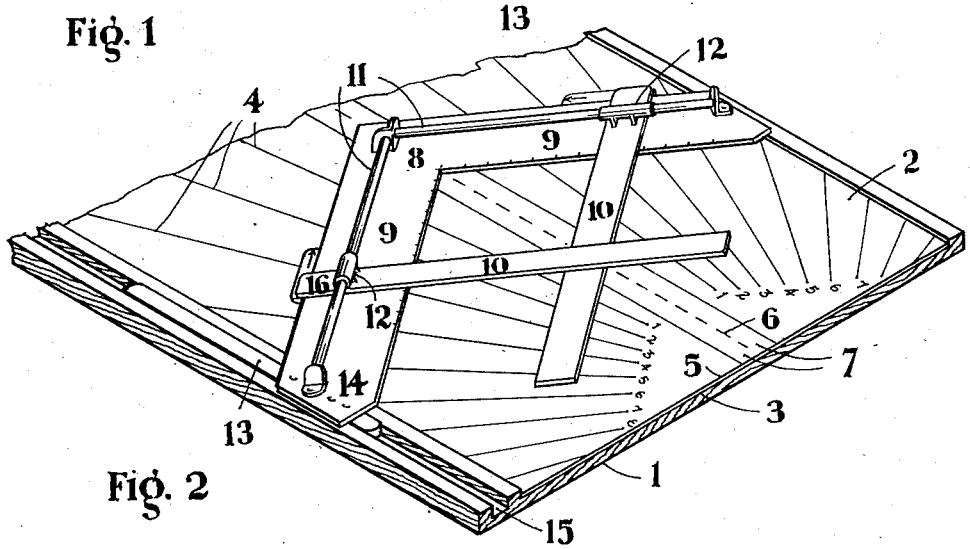
Fig. 2 is an end view of a preferred form of the device shown in Fig. 1.

It is desirable that there be sufficient space between the under surface of strips 9 and the surface of scale 2 to permit the insertion therebetween of a stiff sheet of paper, such as drawing paper. This may be accomplished either by allowing a slight vertical play of slide 13 in groove 15, or preferably, by raising the edges of groove 15 slightly above the surface of scale 2, as shown in Fig. 2.

At an end 16 of each of arms 10 is secured an indicator tab 17. Tabs 17 are adapted to slide upon the outer edges of strips 9 and extend inwardly from the inner edges of arms 10 so that when arms 10 are set at the zero point of the scales on strips 9, the indicator tips of tabs 17 will rest upon the zero line or lines of scale 2.

In practice, the surface to be reduced, such as a photograph is placed upon scale 2. Masking frame 8 may then be moved over the photograph, and arms 10 moved upon their respective slides until arms 10 and strips 9 enclose so much of the photograph surface as the operator may desire to have reproduced. The dimensions of the enclosed photograph portion may be obtained by reading the points of intersection of the inner edges of arms 10 with the scale upon the inner edges of strips 9.

As frame 8 is moved along groove 15, index tabs 17 show upon scale 2 the reduced dimensions of the area enclosed between strips 9 and arms 10 that will result from varying degrees of reduction of that area, said reduced dimensions being equal in inches or other unit employed to the numbers on scale 2 of the two lines 4 adjacent the indicator ends of tabs 17. Each indicator tab gives the reading for the dimension to which its arm 10 lies at right angles. Thus at any position of frame 8 along groove 15, each indicator 17 will show upon scale 2 the reduced length of the dimension which it represents that will result from a reduction of the other dimension to a length equal to the reading of the other indicator 17 on scale 2.

After frame 8 has been adjusted to show the reduced dimensions of the whole area selected for reduction, the eventual size of any part or detail within that area may be determined by moving arms 10 and the photograph or other surface under treatment until strips 9 and arms 10 enclose said part or detail, frame 8 as a whole remaining unmoved upon scale 2. The readings of indicators 17 upon scale 2 will then give the desired dimensions of the particular part or detail selected.

It will be apparent to those skilled in the art that reduction specifications may be readily and accurately determined upon the device of my invention by the above described and other adjustments of the masking frame with respect to the photograph or other surface to be reduced and with respect to the reduction scale. It will also be apparent that structural details of the specific embodiment of my invention described are capable of variation without departing from the spirit and scope of my invention.

I claim:

1. A device for determining dimensional reductions, comprising a base, a reduction scale provided on said base and having a multiplicity of converging lines, a frame member comprising two fixed arms set in angular relation and two movable arms adapted to slide on said fixed arms, said frame member adapted to slide over the surface of said scale in a fixed relation thereto, said converging lines being equally spaced apart upon edge lines of said arms at any position of said frame in its path over said scale.

2. A device for determining dimensional reductions, comprising a base, a reduction scale provided on said base and a masking frame movable in a fixed path thereover, said frame having two fixed sides and two movable sides slidably mounted on said fixed sides, each of said movable sides having an indicator member at an end thereof, said indicator members showing on said scale equal proportional reductions of the respective dimensions of the space enclosed by said masking frame.

3. In combination, a base having upon one surface thereof a reduction scale comprising two oppositely disposed similar scale parts, and a masking frame slidably mounted upon said base and extending over said scale, said frame having two fixed sides and two movable sides, each of said movable sides slidably mounted upon one of said fixed sides, one of said movable sides positioned to slide over the other, and an indicator member on each of said movable sides adapted to read on one of said scale parts.

4. A device for determining dimensional reductions comprising a base, a reduction scale member secured upon the upper surface of said base, the scale on said member comprising two parallel central lines and a multiplicity of converging lines upon both sides of the space between said central lines, said converging lines consecutively numbered from said central lines at either side thereof, a groove in said base parallel to said central lines of said scale, a masking frame having two fixed sides and two sides movable on said fixed sides, said frame mounted on a slide in said groove, said fixed sides of said frame extending over said scale at opposite sides of said central lines and at a predetermined angular relation thereto, and indicator members mounted at an end of each of the movable sides of said frame.

5. A device for determining dimensional reductions comprising a base, a scale provided on said base and an adjustable masking frame movable in a fixed path thereover, indicator members on said frame, said scale and said indicator members cooperating to show equal proportional alterations in the respective dimensions of the space enclosed by said frame at any position of said frame in its path over said scale.

L. REGINALD CHANDLER.